June 26, 1928.                J. F. MacINDOE                1,675,189
LUBRICATOR
Filed July 7, 1927
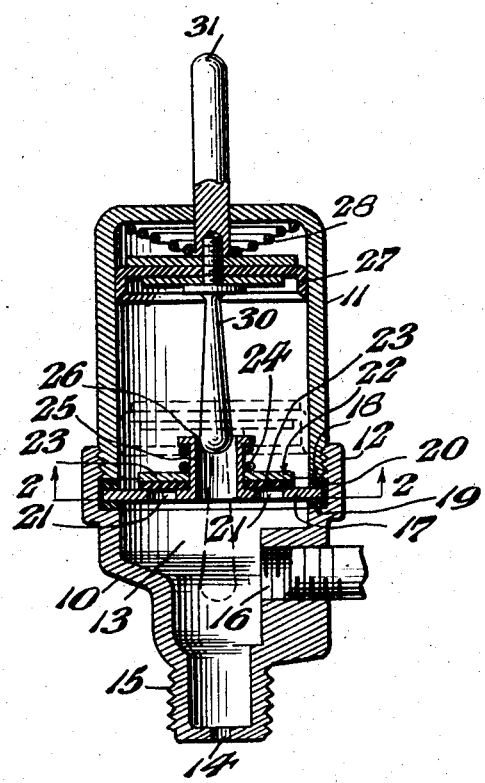
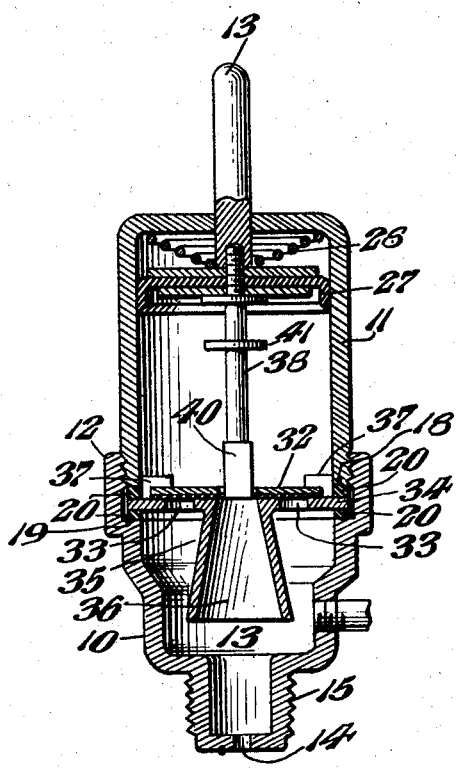
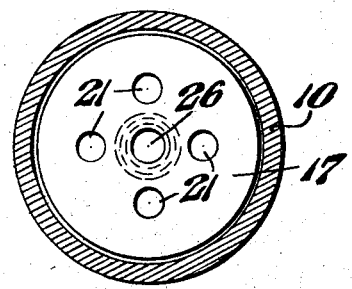
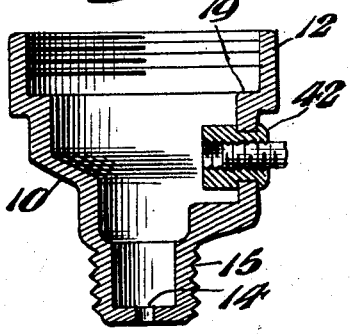
INVENTOR
John F. MacIndoe,
BY
ATTORNEY Patented June 26, 1928.

1,675,189

UNITED STATES PATENT OFFICE.

JOHN FRANKLIN MacINDOE, OF EAST FALLS, PENNSYLVANIA.

LUBRICATOR.

Application filed July 7, 1927. Serial No. 204,091.

The present invention relates to pressure operated lubricators, and more particularly to a pressure filling control and a pressure discharge control.

Some of the objects of the present invention are to provide an improved pressure actuated grease or other lubricating device; to provide an efficient means actuated by pressure for filling a pressure discharging cup without introducing the grease or other lubricant through the controlled discharge passage; to provide a filling mechanism for grease cups which is automatically rendered inoperative during the discharging operation of the cup; to provide a simple and efficient pressure operated lubricating cup formed of pressed metal; to provide a lubricating cup having a main reservoir and an auxiliary storage chamber, both cooperating to give a predetermined uniform discharge of lubricant regardless of variation in the pressure of the controlling discharge spring; and to provide other improvements as will hereinafter appear.

In the accompanying drawings:

Figure 1 represents a sectional elevation of a pressure operated lubricator embodying one form of the present invention;

Figure 2 represents a section on line 2—2 of Figure 1;

Figure 3 represents a sectional elevation of a lubricator embodying another form of the invention; and Figure 4 represents a sectional elevation of the cup discharge casing provided with a modified form of attachment device.

Referring to the drawings, one form of the present invention comprises a two part casing formed of pressed metal consisting of a discharge part 10 and a reservoir cup 11 which are respectively internally and externally threaded for interfitting connection as shown at 12. The discharge part 10 forms a storage or receiving chamber 13 and preferably decreases in cross sectional area toward its discharge end where it terminates in a discharge opening 14 of fixed diameter and generally relatively small. That portion of the part 10 which leads to the discharge outlet 14 and forms the neck thereof, is exteriorly threaded as shown at 15 for attachment to the part to be lubricated. One side of the part 10 is provided with a threaded opening 16 for connection to a grease gun and this opening communicates with the chamber 13 for filling purposes.

For the purpose of controlling both the admission of grease or lubricant to the cup 11 and the discharge of grease or lubricant from the cup 11 to the chamber 13, a plate 17 of disk form is interposed between the annular face 18 of the cup 11 and an annular shoulder 19 of the part 10 and leakage about the joint formed between these parts is prevented by two ring gaskets 20 located on opposite sides of the plate 17.

For introducing lubricant from the chamber 13 into the cup 11, the plate 17 is provided with a plurality of ports 21 and these are arranged to be controlled by a lift valve disc 22 preferably of thin metal operating in conjunction with a leather washer 23 to open the ports 21 under pressure for the passage of the lubricant. In the present instance, this disc 22 is shown held down in its closed position by a coil spring 24, but this is not always necessary and may be omitted since the discharge pressure is generally sufficient to insure the return of the disc 22 and washer 23 to closed position. The disc 22 and the washer 23 form a lift check valve which is normally closed but automatically opens upon reversal of pressure as takes place during the filling operation.

For automatically discharging the grease or lubricant from the cup 11 with automatic compensation for the necessary fixed outlet area during the first portion of the discharge, the plate 17 is provided with an axially located tubular extension 25 which projects upwardly into the cup 11 and provides a passage 26 of uniform diameter for the discharge of grease from the cup 11 to the chamber 13. In this instance since a spring 24 is provided to assist in the closing of the plate washer valve 23, the upper end of this tubular extension 25 is turned outwardly to form a circumferential shoulder 26 to retain the spring 24 under compressure. The discharge of the lubricant from the cup 11 takes place under the action of a plunger or piston 27 acted upon by a helical spring 28 compressed between the end of the cup 11 and the plunger 27 and normally tending to move the latter toward the discharge passage 26. Attached to the plunger 27 is a control valve member 30 in the form of a depending tapered stem, the large end of which is free to pass through the discharge opening 26 with sufficient clearance to allow the lubricant to pass around between it and the walls of the passage 26. When the cup is discharging the large end of the valve member 30 moves through the passage 26 causing a uniform flow of grease for the period when the piston 27 is moving substantially one quarter of its stroke, and when it emerges from the passage the tapered part of its stem begins to control the quantity of grease in proportion to the weakening of the spring 28 and the net result is the discharge of the same amount of grease in a given time as was discharged while the large end of the valve member was in the passage 26.

For guiding the plunger 27 and also acting as an indicator for the amount of grease in the cup 11, a stem 31 is fast to the plunger 27 and projects with a free sliding fit through the closed end of the cup 11. When the cup is full this stem 31 will be fully extended and as the grease is discharged it will move further into the cup until, when the latter is empty, the end of the stem 31 will be substantially flush with the cup end. In empty position the flange of the stem 30 seats upon the extension 25 and thus protects the piston 27 against contact with the plate 17.

In Figure 3 a modified form of the invention is shown wherein the plate check valve 32 controls the ports 33 in a plate 34 having an attached axial extension 35 which depends into the chamber 13 of the part 10. This extension 35 is formed with an outwardly flared passage 36, the taper of which bears a direct relation to the pressure of the plunger operating spring 28. The flexible check or flap valve 32 is retained in operative relation by suitable guides 37. For the desired uniform control the plunger or piston 27, in this form has a stem 38 provided with a cylindrical plug valve 40, the diameter of which allows a lubricant flow clearance at the inlet to the passage 36 and the length of which corresponds substantially to one quarter of the length of the stroke of the piston 27. This compensates for the necessary fixed outlet area. The stem 38 is provided with a limit stop 41 fast to the stem 38 at the point required to bring the piston 27 to rest at the end of its discharge stroke.

In Figure 4 a modified means is shown for permitting a grease gun nipple to be connected to the part 10 of the lubricator and this consists of a bushing 42 made fast to the pressed metal shell and threaded to receive the end of the gun or other part used to force grease into the shell to fill the cup.

When filling the cup of the present invention, grease or other lubricant is introduced under pressure by way of the opening 16 and fills the chamber 13 to the level of the plate 17 whereupon continued introduction of the lubricant raises the lift valve 22 and allows the lubricant to enter the cup 11. Here the entering lubricant, being under pressure, pushes the piston 27 towards the end of the cup against the pressure of the spring 28 while the stem indicator 31 moves outward to indicate when the cup is full. The cup is now ready for use and the filling pressure being relieved by the removal of the pressure gun, the spring 28 functions to move the piston 27 in the direction to discharge lubricant into the chamber 13 and from there by way of the discharge hole 14. In both the forms of Figure 1 and Figure 3 the initial quarter stroke of the piston is without appreciable spring weakening and flow compensation for this is made possible by the provision of either the fixed area passage 26 working with a tapered valve, or a constant diameter valve plug 40 working with a tapered outlet. When the plunger reaches the point where spring weakening becomes noticeable the end of the tapered stem emerges from the fixed area passage and in the other form the plug 40 passes into the tapered passage 36.

It will now be apparent that a complete unitary grease cup construction has been devised which while applicable to any cup construction is more particularly useful in solving the problem of pressed metal grease cups and the automatic filling and discharging thereof. By the present construction also, a storage reservoir 13 is provided and which is normally full of lubricant to maintain a constant feed to the part to be lubricated but in case of emergency this stored lubricant may become a gravity feed should there be heating sufficient to change the condition of the lubricant.

What is claimed as new and useful is:

1. A grease cup construction comprising a hollow casing having an uncontrolled discharge opening, a plate arranged in said casing to form a main grease reservoir and a storage reservoir, said plate having a grease inlet and a grease outlet, a check valve controlling said inlet and arranged to open under pressure from said storage reservoir, pressure actuated means for controlling said grease outlet, and means for attaching a grease gun to said casing to feed grease into said storage reservoir.

2. A grease cup construction comprising a two part hollow casing, a plate clamped between the parts of said casing to form a main grease reservoir and a storage reservoir, said plate having a plurality of grease inlets and a discharge outlet, a lift valve arranged to control said grease inlets and operative to open under pressure from said storage reservoir, pressure actuated means for automatically proportioning the flow of grease through said discharge outlet, means for forcing grease under pressure into said storage reservoir to open said valve and fill said main reservoir, and an uncontrolled discharge opening from said storage reservoir.

3. A grease cup construction comprising a two part hollow casing, a plate in said casing providing an upper main grease reservoir and a lower storage reservoir, said plate having a plurality of grease inlets and a grease discharge outlet, a lift valve for controlling said inlets and arranged to open under pressure from said storage reservoir, a spring for returning said valve to closed position, pressure actuated means for forcing grease from said main reservoir to said storage reservoir, means for automatically proportioning the flow of grease through said discharge outlet, means for forcing grease under pressure into said storage reservoir to open said valve and fill said main reservoir, and an uncontrolled discharge opening from said storage reservoir.

Signed at Philadelphia, county of Philadelphia, State of Pennsylvania, this 5th day of July, 1927.

JOHN FRANKLIN MacINDOE.